US012613228B2

(12) United States Patent
Discekici et al.

(10) Patent No.: US 12,613,228 B2
(45) Date of Patent: Apr. 28, 2026

(54) THREE-DIMENSIONAL PRINTING WITH ION-SENSING AGENTS

(71) Applicant: PERIDOT PRINT LLC, Palo Alto, CA (US)

(72) Inventors: Emre Hiro Discekici, San Diego, CA (US); Graciela Emma Negri Jimenez, San Diego, CA (US); Shannon Reuben Woodruff, San Diego, CA (US); Jacob Wright, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 948 days.

(21) Appl. No.: 17/777,756

(22) PCT Filed: Dec. 11, 2019

(86) PCT No.: PCT/US2019/065589
§ 371 (c)(1),
(2) Date: May 18, 2022

(87) PCT Pub. No.: WO2021/118545
PCT Pub. Date: Jun. 17, 2021

(65) Prior Publication Data
US 2022/0404322 A1 Dec. 22, 2022

(51) Int. Cl.
| | |
|---|---|
| *G01N 31/22* | (2006.01) |
| *B29C 64/165* | (2017.01) |
| *B29K 77/00* | (2006.01) |
| *B29K 509/02* | (2006.01) |
| *B29L 31/00* | (2006.01) |
| *B33Y 10/00* | (2015.01) |
(Continued)

(52) U.S. Cl.
CPC .......... *G01N 31/22* (2013.01); *B29C 64/165* (2017.08); *B33Y 10/00* (2014.12); *B33Y 70/00* (2014.12); *G01N 21/78* (2013.01); *B29K 2077/00* (2013.01); *B29K 2509/02* (2013.01); *B29K 2995/002* (2013.01); *B29L 2031/752* (2013.01)

(58) Field of Classification Search
None
See application file for complete search history.

(56) References Cited

U.S. PATENT DOCUMENTS

| | | | |
|---|---|---|---|
| 5,053,339 | A | 10/1991 | Patel |
| 6,753,191 | B2 | 6/2004 | Asher et al. |
(Continued)

FOREIGN PATENT DOCUMENTS

| | | |
|---|---|---|
| CN | 110237781 A | 9/2019 |
| DE | 102010037775 B4 | 5/2014 |
| WO | 2019/108288 A1 | 6/2019 |

*Primary Examiner* — Lore R Jarrett
(74) *Attorney, Agent, or Firm* — Dierker & Kavanaugh, P.C.

(57) ABSTRACT

This disclosure describes multi-fluid kits for three-dimensional printing, three-dimensional printing kits, and methods of sensing metal ions using three-dimensional printed ion sensors. In one example, a multi-fluid kit for three-dimensional printing can include a fusing agent and an ion-sensing agent. The fusing agent can include water and an electromagnetic radiation absorber. The electromagnetic radiation absorber can absorb radiation energy and convert the radiation energy to heat. The ion-sensing agent can include water and a redox-active inorganic salt.

14 Claims, 4 Drawing Sheets

600 exposing a three-dimensional printed ion sensor to a solution including a target metal ion, wherein the three-dimensional printed ion sensor includes multiple fused layers of polymer particles, wherein a portion of a surface of the three-dimensional printed ion sensor includes a redox-active inorganic salt immobilized in the fused polymer, wherein the redox-active inorganic salt reacts with the target metal ion to form a water-insoluble colored pigment to color the portion of the surface of the three-dimensional printed ion sensor

610

(51) Int. Cl.
    *B33Y 70/00*          (2020.01)
    *G01N 21/78*        (2006.01)

(56)               References Cited

U.S. PATENT DOCUMENTS

| | | | |
|---|---|---|---|
| 8,343,437 | B2 | 1/2013 | Patel |
| 8,859,288 | B2 | 10/2014 | Li et al. |
| 9,884,476 | B2 | 2/2018 | Albert et al. |
| 2009/0050477 | A1 | 2/2009 | Catt et al. |
| 2017/0225396 | A1* | 8/2017 | Tom ..................... B33Y 10/00 |
| 2018/0370080 | A1 | 12/2018 | McCarthy et al. |
| 2019/0047216 | A1* | 2/2019 | Emamjomeh .......... B33Y 10/00 |
| 2019/0143453 | A1* | 5/2019 | Anthony ................. B22F 10/50 |
| | | | 219/76.1 |
| 2020/0376753 | A1* | 12/2020 | Kabalnov ............. B29C 64/194 |

* cited by examiner

100

200

300

400

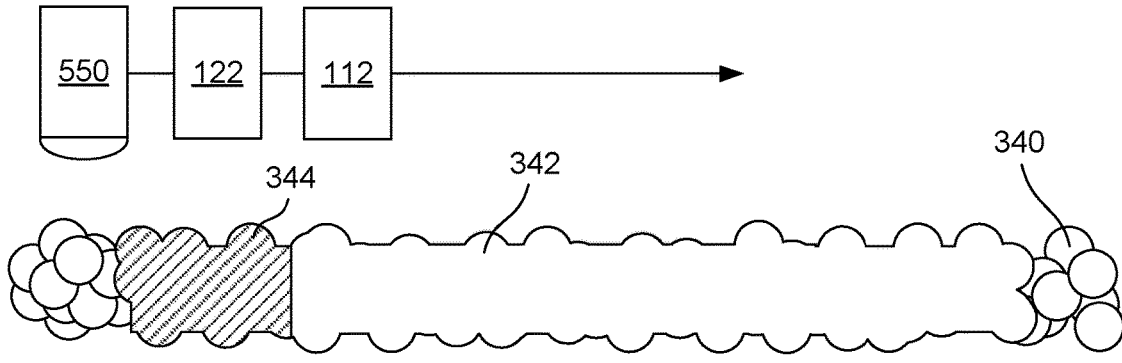

FIG. 5C

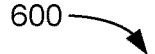

exposing a three-dimensional printed ion sensor to a solution including a target metal ion, wherein the three-dimensional printed ion sensor includes multiple fused layers of polymer particles, wherein a portion of a surface of the three-dimensional printed ion sensor includes a redox-active inorganic salt immobilized in the fused polymer, wherein the redox-active inorganic salt reacts with the target metal ion to form a water-insoluble colored pigment to color the portion of the surface of the three-dimensional printed ion sensor — 610

FIG. 6

THREE-DIMENSIONAL PRINTING WITH ION-SENSING AGENTS

BACKGROUND

Methods of three-dimensional digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

BRIEF DESCRIPTION OF THE DRAWINGS

FIGS. 5A-5C show a schematic view of an example three-dimensional printing process using an example three-dimensional printing kit in accordance with examples of the present disclosure.

FIG. 6 is a flowchart illustrating an example method of sensing a metal ion in accordance with examples of the present disclosure.

DETAILED DESCRIPTION

Figure 1:
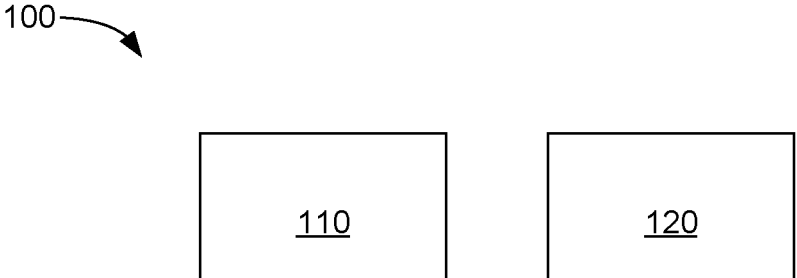
FIG. 1 is a schematic view of an example multi-fluid kit for three-dimensional printing in accordance with examples of the present disclosure.

The present disclosure describes multi-fluid kits for three-dimensional printing, three-dimensional printing kits, and methods of sensing metal ions. In one example, a multi-fluid kit for three-dimensional printing includes a fusing agent and an ion-sensing agent. The fusing agent includes water and an electromagnetic radiation absorber. The electromagnetic radiation absorber absorbs radiation energy and converts the radiation energy to heat. The ion-sensing agent includes water and a redox-active inorganic salt. In some examples, the redox-active inorganic salt can be reactive with a target metal cation to form a water-insoluble colored pigment, wherein the target metal cation is $Fe^{2+}$, $Fe^{3+}$, $Zn^{2+}$, $Cu^{2+}$, or $Ba^{2+}$. In further examples, the redox-active inorganic salt can be $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$. In certain examples, the redox-active inorganic salt can be present in an amount from about 0.5 wt % to about 10 wt % with respect to the total weight of the ion-sensing agent. In certain further examples, the fusing agent can be a colorless fusing agent or a low tint fusing agent.

The present disclosure also describes three-dimensional printing kits. In one example, a three-dimensional printing kit includes a powder bed material, a fusing agent to selectively apply to the powder bed material, and an ion-sensing agent to selectively apply to the powder bed material. The powder bed material includes polymer particles. The fusing agent includes water and an electromagnetic radiation absorber, wherein the electromagnetic radiation absorber absorbs electromagnetic radiation energy and converts the electromagnetic radiation energy to heat. The ion-sensing agent includes water and a redox-active inorganic salt. In some examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. In further examples, the powder bed material can also include titanium dioxide in an amount from about 1 wt % to about 5 wt % with respect to the total weight of the powder bed material. In still further examples, the redox-active inorganic salt can be $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$. In certain examples, the redox-active inorganic salt can be present in an amount from about 0.5 wt % to about 10 wt % with respect to the total weight of the ion-sensing agent. In some examples, the fusing agent can be a colorless fusing agent or a low tint fusing agent.

The present disclosure also describes methods of sensing metal ions. In one example, a method of sensing a metal ion includes exposing a three-dimensional printed ion sensor to a solution including a target metal ion. The three-dimensional printed ion sensor includes multiple fused layers of polymer particles, wherein a portion of a surface of the three-dimensional printed ion sensor includes a redox-active inorganic salt immobilized in the fused polymer, wherein the redox-active inorganic salt reacts with the target metal ion to form a water-insoluble colored pigment to color the portion of the surface of the three-dimensional printed ion sensor. In some examples, the target metal cation can be $Fe^{2+}$, $Fe^{3+}$, $Zn^{2+}$, $Cu^{2+}$, or $Ba^{2+}$ and the redox-active inorganic salt can be $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$. In further examples, the method can also include making the three-dimensional printed ion sensor by: iteratively applying individual build material layers of the polymer particles to a powder bed; based on a three-dimensional object model, selectively jetting a fusing agent onto the individual build material layers, wherein the fusing agent includes water and an electromagnetic radiation absorber; based on the three-dimensional object model, selectively jetting an ion-sensing agent onto the individual build material layers, wherein the ion-sensing agent includes water and the redox-active inorganic salt; and exposing the powder bed to energy to selectively fuse the polymer particles in contact with the electromagnetic radiation absorber to form a fused polymer matrix at individual build material layers. In still further examples, the fusing agent can be a colorless fusing agent or a low tint fusing agent.

It is noted that when discussing the multi-fluid kits, three-dimensional printing kits, and methods herein, these discussions can be considered applicable to one another whether or not they are explicitly discussed in the context of that example. Thus, for example, when discussing a fusing agent related to a three-dimensional printing kit, such disclosure is also relevant to and directly supported in the context of methods and systems, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Multi-Fluid Kits for Three-Dimensional Printing

The multi-fluid kits described herein can be used to make three-dimensional printed objects that can detect the presence of certain metal cations. In particular, an ion-sensing agent can be use during the three-dimensional printing process to form certain portions of the three-dimensional printed object that are sensitive for detecting the target metal cations. These sensitive portions can change color upon exposure to the target metal cation, providing a simple way to test for the target metal cation. The three-dimensional printing processes described herein can produce a wide variety of custom-shaped three-dimensional printed sensors that can be incorporated into a variety of systems or processes where metal ion sensing is desired. The three-dimensional printed sensors can also be reproduced cheaply, so that the three-dimensional printed sensor can be replaceable in some examples. Detecting metal ions can be useful in many applications, such as detecting corrosion of metal equipment, monitoring the content of machine lubricants such as motor oil, water quality monitoring, and so on. The ion-sensing agent can be selectively applied to the build material during three-dimensional printing, so that the portion of the three-dimensional printed object that senses the target metal cation can have any desired shape. The sensitive portion can be formed in the shape of images or words in some examples. These images or words can initially match the color of the rest of the three-dimensional printed object so that the images or words are initially invisible, but then the images or words can change color and become visible when exposed to the target metal cation.

The three-dimensional printing processes described herein can include applying a fusing agent to a powder bed material that includes polymer particles. The fusing agent can include a radiation absorber, which can be a compound or material that absorbs electromagnetic radiation energy (such as UV or infrared radiation) and converts the energy to heat. The fusing agent can be applied to any areas of the powder bed that are desired to become part of the solid three-dimensional printed object. Additionally, the ion-sensing agent can be applied to portions of the powder bed where ion-sensing ability is desired. The ion-sensing agent can include a redox-active inorganic salt that can react with the target metal cation to form a colored pigment. After applying the fusing agent, a radiation source is used to irradiate the powder bed. The areas of the powder bed where the fusing agent was applied can be selectively heated to a melting or softening point temperature of the polymer particles so that the polymer particles fuse together to form a solid layer of the final three-dimensional printed object.

The redox-active inorganic salt from the ion-sensing agent can become locked in place in the solid polymer matrix when the polymer particles fuse together. Thus, the portion of the three-dimensional printed object where the ion-sensing agent was applied can have the redox-active inorganic salt distributed throughout the polymer matrix. When the three-dimensional printed object contacts the target metal cation, the target metal cation can react with the redox-active inorganic salt to form a colored pigment. The appearance of the colored pigment can indicate that the target metal cation is present. As mentioned above, in some examples the ion-sensing agent can be selectively applied to form a pattern, image, or word on the surface of the three-dimensional printed object. The pattern, image, or word can change color when the redox-active inorganic salt reacts with the target metal cation to form the colored pigment.

One example of this reaction is the formation of "Prussian blue" pigment. In one example, the redox-active inorganic salt that is in the ion-sensing agent can be $K_3[Fe(CN)_6]$. This salt can react with iron(II) ions to form a blue pigment. Therefore, if a three-dimensional printed object includes sensing portions made with this ion-sensing agent and is placed in an aqueous solution including iron ions, for example, then the iron ions can react with the inorganic salt to cause the sensing portions to turn blue. The same pigment can also be formed by the reaction of $K_4[Fe(CN)_6]$ with iron(III) ions in other examples. In certain examples, the ferrocyanide with a higher oxidation state can be included in the ion-sensing agent to avoid unwanted oxidation occurring during three-dimensional printing due to the high temperatures employed in the three-dimensional printing process. Thus, in some examples the ion-sensing agent can include $K_3[Fe(CN)_6]$, which has ferrocyanide with an oxidation state of $-3$, as opposed to $K_4[Fe(CN)_6]$, which has ferrocyanide with an oxidation state of $-4$. However, in other examples, the ion-sensing agent can include $K_4[Fe(CN)_6]$. The target metal cation for $K_3[Fe(CN)_6]$ can be iron(II), and the target metal cation for $K_4[Fe(CN)_6]$ can be iron(III).

With this description in mind, FIG. 1 shows a schematic of an example multi-fluid kit for three-dimensional printing 100. The kit includes a fusing agent 110 and an ion-sensing agent 120. The fusing agent can include water and an electromagnetic radiation absorber. The electromagnetic radiation absorber can absorb radiation energy and convert the radiation energy to heat. The ion-sensing agent can include water and a redox-active inorganic salt. The redox-active inorganic salt can be reactive with a target metal cation to form a water-insoluble colored pigment.

As used herein, "water-soluble" refers to materials that can be dissolved in water at a concentration from about 5 wt % to about 99 wt % of the dissolved material with respect to the entire weight of the solution. The solution of a water soluble material can be fully transparent without any phase separation. Materials that are not water-soluble can be referred to as "water-insoluble."

Figure 2:
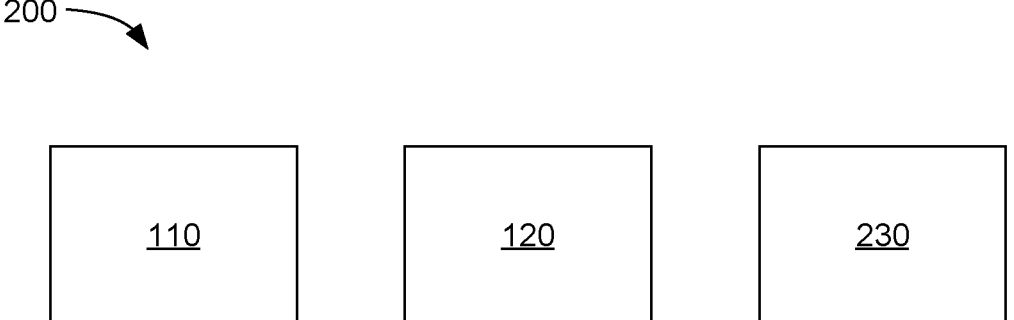
FIG. 2 is a schematic view of another example multi-fluid kit for three-dimensional printing in accordance with examples of the present disclosure.

FIG. 2 shows another example multi-fluid kit 200 for three-dimensional printing. This example includes a fusing agent 110, an ion-sensing agent 120, and a detailing agent 230. The fusing agent and ion-sensing agent can include the ingredients described above. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

The ingredients and properties of the fusing agent, reactive agents, and detailing agent are described in more detail below.

Three-Dimensional Printing Kits

The present disclosure also describes three-dimensional print kits that can include a combination of fluid agents and powder bed material. In some examples, the three-dimensional printing kits can include a powder bed material that includes polymer particles, a fusing agent, and an ion-sensing agent as described above.

Figure 3:
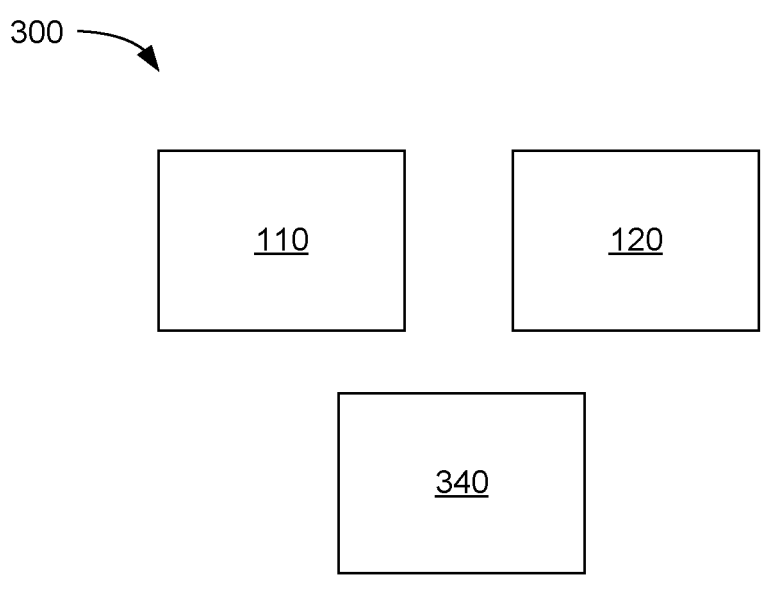
FIG. 3 is a schematic view of an example three-dimensional printing kit in accordance with examples of the present disclosure.

FIG. 3 is a schematic of one example three-dimensional printing kit 300. This three-dimensional printing kit includes a powder bed material 340, a fusing agent 110, and an ion-sensing agent 120. The powder bed material can include polymer particles. The fusing agent can include water and an electromagnetic radiation absorber, wherein the electromagnetic radiation absorber absorbs electromagnetic radiation energy and converts the electromagnetic radiation energy to heat. The ion-sensing agent can include water and a redox-active inorganic salt.

Figure 4:
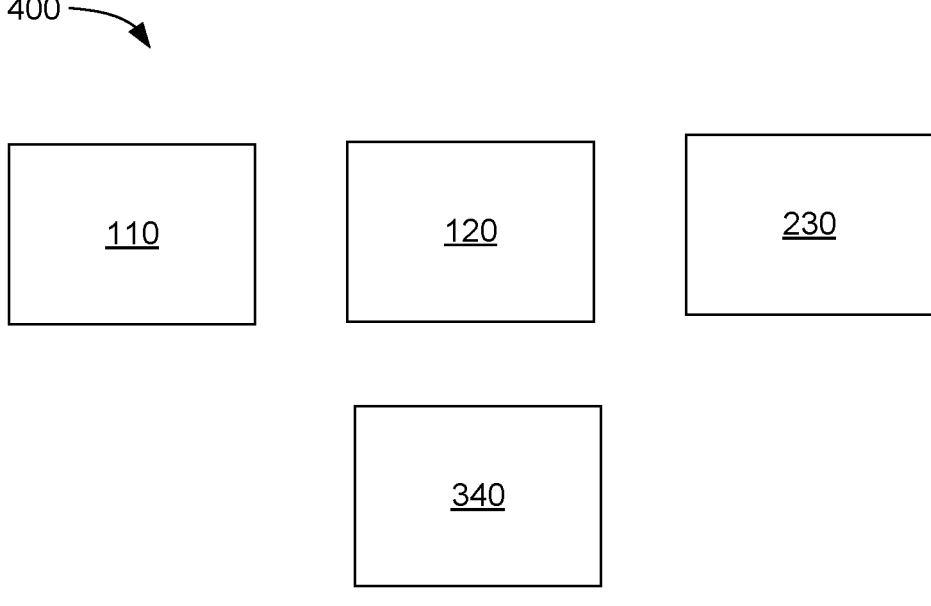
FIG. 4 is a schematic view of another example three-dimensional printing kit in accordance with examples of the present disclosure.

Another example is shown in FIG. 4. This figure shows an example three-dimensional printing kit 400 that includes a powder bed material 340, a fusing agent 110, an ion-sensing agent 120, and a detailing agent 230. The powder bed material, fusing agent, ion-sensing agent, and detailing agent can include the ingredients described above.

Figure 5A:
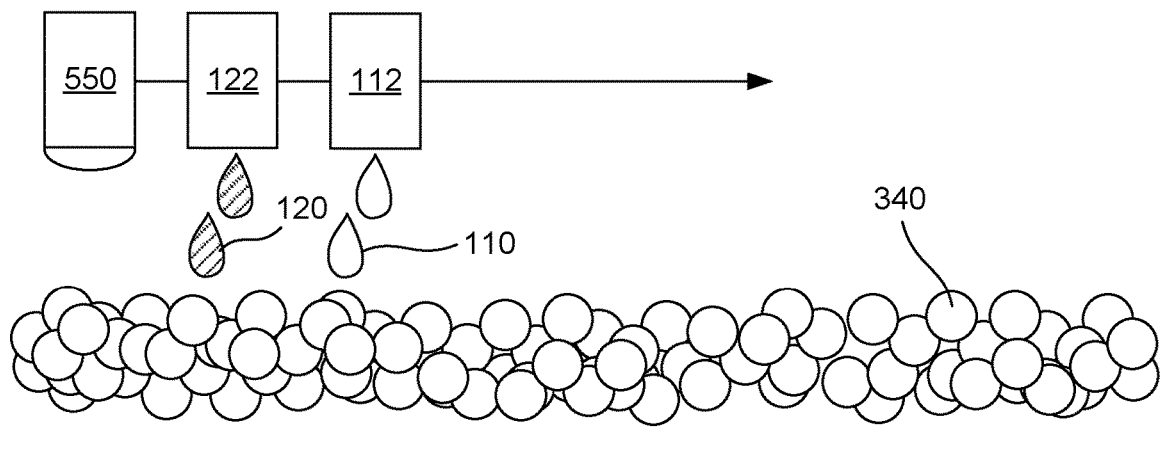
Figure 5B:
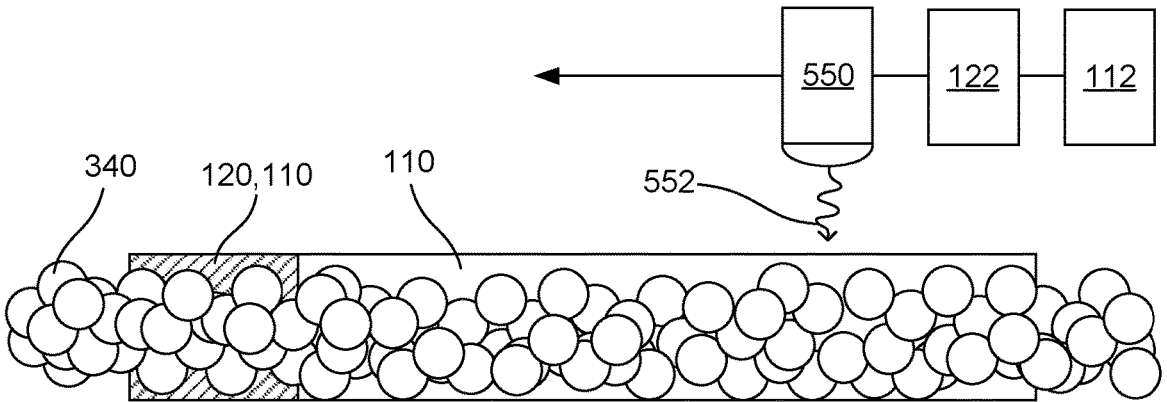

FIGS. 5A-5C illustrate one example of using the three-dimensional printing kits to form a three-dimensional printed object. In FIG. 5A, a fusing agent 110 and an ion-sensing agent 120 are jetted onto a layer of powder bed material 340 made up of polymer particles. The fusing agent is jetted from a fusing agent ejector 112 and the ion-sensing agent is jetted from an ion-sensing agent ejector 122. These fluid ejectors can move across the layer of powder bed material to selectively jet the fusing agent on areas that are to be fused, while the ion-sensing agent can be jetted onto areas that are to be sensitive for detecting the target metal cation. A radiation source 550 can also move across the layer of powder bed material.

FIG. 5B shows the layer of powder bed material after the fusing agent 110 and the ion-sensing agent 120 have been jetted onto the powder bed. The fusing agent has been jetted in an area of the polymer powder layer that is to be fused. The ion-sensing agent was jetted in an area at the edge of the layer where the fusing agent was also jetted. This area is to be the sensor area, which will change color upon exposure to the target metal cation. In this figure, the radiation source 550 is shown emitting radiation 552 toward the layer of powder bed material 340. The fusing agent can include a radiation absorber that can absorb this radiation and convert the radiation energy to heat.

FIG. 5C shows the layer of powder bed material 340 with a fused portion 342 where the fusing agent was jetted. This portion has reached a sufficient temperature to fuse the polymer particles together to form a solid polymer matrix. The fused portion includes a sensitive area 344 which includes the redox-active inorganic salt from the ion-sensing agent. The process shown in FIGS. 5A-5C can be repeated with additional layers of powder bed material to build up a three-dimensional printed object layer by layer. As explained above, the ion-sensing agent can be jetted in areas that will be sensitive for detecting the target metal cation. In some examples, the areas where the ion-sensing agent is jetted can be areas that will become portions of the surface of the finished three-dimensional printed object.

Powder Bed Material

The powder bed material can include polymer particles having a variety of shapes, such as substantially spherical particles or irregularly-shaped particles. In some examples, the polymer powder can be capable of being formed into three-dimensional printed objects with a resolution of about 20 µm to about 100 µm, about 30 µm to about 90 µm, or about 40 µm to about 80 µm. As used herein, "resolution" refers to the size of the smallest feature that can be formed on a three-dimensional printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 612, thermoplastic polyamide, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The powder bed material can also in some cases include a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the powder bed build material. The fusing agent can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_5$, $MgCuSi_2O_6$, $Cu_2Si_2Oe$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In alternative examples, the radiation absorber can preferentially absorb ultraviolet radiation. In some examples, the radiation absorber can absorb radiation in wavelength range from about 300 nm to about 400 nm. In certain examples, the amount of electromagnetic energy absorbed by the fusing agent can be quantified as follows: a layer of the fusing agent having a thickness of 0.5 μm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 μm layer of the fusing agent can absorb from 0% to 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Ion-Sensing Agents

The ion-sensing agents described herein can be fluids that include a redox-active inorganic salt that can react with a target metal cation to form a colored pigment. In some examples, target metal cations can also be in the form of a redox-active salt. Certain pairs of such redox-active salts can react together (for example, in an aqueous solution) to form a colored pigment. Thus, in some cases either salt from a pair of such redox-active salts can be included in the ion-sensing agent, depending on which ion is the target ion to be detected. One redox-active salt can be included in the ion-sensing agent that is applied to the powder bed material during three-dimensional printing. The final three-dimensional printed object can then be placed in contact with a fluid or other material that may or may not include the target metal cation. If the target metal cation is present, then the target metal cation can react with the redox-active salt to form the colored pigment. A variety of colored pigments can be made by chemically reacting a redox-active salt and a target metal cation in this way.

In certain examples, the target metal cation to be detected can include $Fe^{2+}$, $Fe^{3+}$, $Zn^{2+}$, $Cu^{2+}$, or $Ba^{2+}$. In certain examples, the redox-active inorganic salt used to detect these cations can include $K_2CrO_4$, $Na_2CrO_4$, $NaHCO_3$, $Na_2CO_3$, $Na_2SO_4$, $NaOH$, $K_4[Fe(CN)_6]$, or $K_3[Fe(CN)_6]$. In other examples, the redox-active inorganic salt can include $FeSO_4$, $BaCl_2$, $CuSO_4$, $ZnSO_4$, or $ZnCl_2$. These salts correspond to the cations $Fe^{2+}$, $Fe^{3+}$, $Zn^{2+}$, $Cu^{2+}$, or $Ba^{2+}$. However, if it is desired to detect cations produce by dissolving $K_2CrO_4$, $Na_2CrO_4$, $NaHCO_3$, $Na_2CO_3$, $Na_2SO_4$, $NaOH$, $K_4[Fe(CN)_6]$, or $K_3[Fe(CN)_6]$, then the ion-sensing agent can include $FeSO_4$, $BaCl_2$, $CuSO_4$, $ZnSO_4$, or $ZnCl_2$ to react with these cations. Thus, for any given pair of reactants that can form a colored pigment, either of the reactants may be included in the ion-sensing agent in order to detect the complimentary reactant. Some examples of pigments that can be formed from these reactants include iron oxide red, barium white, basic copper carbonate, zinc chrome yellow, Prussian blue, and others.

The concentration of the redox-active inorganic salt in the ion-sensing agent can be selected depending on the desired amount of ion-sensing agent that will be applied to the powder bed material and the desired amount of redox-active inorganic salt to be present in the final three-dimensional printed object. When the ion-sensing agent is applied to the powder bed, the water and any volatile co-solvents in the agent will evaporate because of the high temperatures in the three-dimensional printing process. Thus, the redox-active inorganic salt and any other solids will be left behind in the powder bed. The amount of redox-active inorganic salt that is applied to the powder bed can be adjusted by changing the amount of the ion-sensing agent that is jetted onto the powder bed. In some examples, the concentration of the redox-active inorganic salt in the ion-sensing agent can be within the solubility limits of the particular redox-active inorganic salt, so that the salt can be completely dissolved. In certain examples, the concentration of the redox-active inorganic salt in the ion-sensing agent can be from about 0.01 mol/L to about 0.5 mol/L. In further examples, the concentration can be from about 0.02 mol/L to about 0.2 mol/L. In other examples, the amount of the redox-active inorganic salt can be from about 0.5 wt % to about 10 wt % with respect to the total weight of the ion-sensing agent, or from about 1 wt % to about 8 wt % or from about 2 wt % to about 5 wt % with respect to the total weight of the ion-sensing agent.

In some examples, the water-insoluble pigment formed by the redox-active inorganic salt and the target metal cation can be Prussian blue. Prussian blue is an oxidation product of ferrous ferrocyanide salt. Specifically, Prussian blue has the chemical formula $KFe[Fe(CN)_6]_{(s)}$. Prussian blue can be formed using the following reaction:

$$K^+_{(aq)} + Fe^{2+}_{(aq)} + [Fe(CN)_6]^{3-}_{(aq)} KFe[Fe(CN)_6]_{(s)}$$

In other examples, Prussian blue can also be formed using the following reaction:

$$K^+_{(aq)} + Fe^{3+}_{(aq)} + [Fe(CN)_6]^{4-}_{(aq)} KFe[Fe(CN)_6]_{(s)}$$

In a specific example, Prussian blue can be formed by reacting $FeSO_4$ with $K_3[Fe(CN)_6]$. The $FeSO_4$ can produce an iron(II) ion ($Fe^{2+}$). Thus, in some examples the target meta cation can be $Fe^{2+}$ and the redox-active inorganic salt in the ion-sensing agent can be $K_3[Fe(CN)_6]$. In other examples, the target metal cation can be $Fe^{3+}$ and the redox-active inorganic salt can be $K_4[Fe(CN)_6]$. However, as mentioned above, in some examples it can be useful to use the high oxidation state of the ferrocyanide ion in the ion-sensing agent, which can come from $K_3[Fe(CN)_6]$, so that the ferrocyanide ion is not oxidized by exposure to high temperatures during three-dimensional printing.

In another example, the water-soluble pigment can be iron oxide red. Iron oxide red has the chemical formula $Fe_2O_3$. This pigment can be formed using the following reaction:

$$2\ FeSO_4 + \tfrac{1}{2}O_2 + 4NaOH \rightarrow Fe_2O_3 + 2Na_2SO_4 + H_2O$$

Therefore, in some examples the target metal cation can be $Fe^{2+}$ and the redox-active inorganic salt can be $NaOH$.

In yet another example, the water-insoluble pigment can be barium white. The chemical formula of barium white is $BaSO_4$. This pigment can be made by the following reaction:

$$BaCl_2 + Na_2SO_4 \rightarrow BaSO_4 + 2NaCl$$

Therefore, in some examples, the target metal cation can be $Ba^{2+}$ and the redox-active inorganic salt can be $Na_2SO_4$.

In another example, the water-insoluble pigment can be basic copper carbonate. Basic copper carbonate has the chemical formula $Cu_2(OH)_2CO_3$. This pigment can be formed using the following reaction:

$$2CuSO_4 + 2Na_2CO_3 + H_2O \rightarrow Cu_2(OH)_2CO_3 + 2Na_2SO_4 + CO_2$$

Therefore, in some examples, the target metal cation can be $Cu^{2+}$ and the redox-active inorganic salt can be $Na_2CO_3$. In another example, basic copper carbonate can be formed using the following reaction:

$$2CuSO_4 + 4NaHCO_3 \rightarrow Cu_2(OH)_2CO_3 + 2Na_2SO_4 + 3CO_2 + H_2O$$

Therefore, in other examples, the target metal cation can be $Cu^{2+}$ and the redox-active inorganic salt can be $NaHCO_3$.

In still another example, the water-insoluble pigment can be zinc chrome yellow. Zinc chrome yellow has the chemical formula $ZnCrO_4$ and can be formed using the following reaction:

$$K_2CrO_4 + ZnSO_4 \rightarrow ZnCrO_4 + K_2SO_4$$

Therefore, in some examples, the target metal cation can be $Zn^{2+}$ and the redox-active inorganic salt can be $K_2CrO_4$.

In further examples, the water-insoluble pigment can be any pigment that is formable by combining two or more water-soluble reactants. One of the reactants can be the redox-active inorganic salt that is included in the ion-sensing agent, and the other reactant can be the target metal cation to be detected.

The reactive agents can also include ingredients to allow the reactive agents to be jetted by a fluid jet printhead. In some examples, the reactive agents can include ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Methods of Sensing Metal Ions

The present disclosure also describes methods of sensing metal ions using the three-dimensional printed objects described herein. FIG. 6 shows a flowchart illustrating one example method 600 of sensing a metal ion. The method includes exposing a three-dimensional printed ion sensor to a solution including a target metal ion, wherein the three-dimensional printed ion sensor includes multiple fused layers of polymer particles, wherein a portion of a surface of the three-dimensional printed ion sensor includes a redox-active inorganic salt immobilized in the fused polymer, wherein the redox-active inorganic salt reacts with the target metal ion to form a water-insoluble colored pigment to color the portion of the surface of the three-dimensional printed ion sensor 610.

The three-dimensional printed ion sensor can be made using the three-dimensional printing processes described herein. In certain examples, the method of sensing a metal ion can also include the formation of the three-dimensional printed ion sensor. In one example, the three-dimensional printed ion sensor can be made by iteratively applying individual build material layers of polymer particles to a powder bed; based on a three-dimensional object model, selectively jetting a fusing agent onto the individual build material layers, wherein the fusing agent includes water and an electromagnetic radiation absorber; based on the three-dimensional object model, selectively jetting an ion-sensing agent onto the individual build material layers, wherein the ion-sensing agent includes water and the redox-active inorganic salt; and exposing the powder bed to energy to selectively fuse the polymer particles in contact with the electromagnetic radiation absorber to form a fused polymer matrix at individual build material layers.

The redox-active inorganic salt can be any of the salts described above. Furthermore, the target metal cation can be any of the metal cations described above.

In some examples, a detailing agent can also be jetted onto the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas The fusing agent, ion-sensing agent, and detailing agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if the layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce the printed layer. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate the layers from about 0.5 to about 10 seconds per pass.

The three-dimensional printed object can be formed by jetting a fusing agent onto layers of powder bed build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. In certain examples, the three-dimensional object model can define the three-dimensional shape of the object and the three-dimensional shape of areas of the powder bed to be jetted with detailing agent. In other examples, the object can be defined by a first three-dimensional object model a second three-dimensional object model can define areas to jet the detailing agent. In further examples, the jetting of the detailing agent may not be controlled using a three-dimensional object model, but using some other parameters or instructions to the three-dimensional printing system. Other information may also be included in three-dimensional object models, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying individual build material layers of polymer particles to a powder bed" also includes spreading layers of polymer particles over the loose particles and fused layers beneath the new layer of polymer particles.

The three-dimensional printed ion sensors can, in some examples, be made with a colorless or low tint fusing agent. The sensor area where the ion-sensing agent was applied can have a color initially matching the rest of the three-dimensional printed ion sensor, but the sensor area can change color when exposed to the target metal cation. Because the ion-sensing agent can be selectively jetted using a fluid jet print head, the shaped of the sensor area can be made any desired shape. Jetting the ion-sensing agent during three-dimensional printing can provide voxel-level control over the location of the redox-active inorganic salt from the ion-sensing agent. In some examples, it can be useful to design the sensor area to communicate a message or idea to a user. For example, a sensor for detecting iron ions can have a sensor area shaped as the word "IRON." If the sensor is exposed to iron ions, then the word "IRON" can appear as a colored word in contrast to the colorless polymer of the remainder of the three-dimensional printed object. In further examples, a three-dimensional printed sensor can include multiple different sensor areas that have different redox-active inorganic salts that can react with different target metal ions. The individual sensor areas may be designed with different patterns, images, or words so that a user can determine which of the target metal ions has been detected.

In addition to using the three-dimensional printed objects described herein as sensors to detect the present of a metal cation where the presence is unknown, the principles described herein can also be used to intentionally color certain portions of a three-dimensional printed object in post-processing. For example, a three-dimensional object can be prepared with a hidden image or message made using the redox-active inorganic salt, and then the object can be dipped in a solution of the ion that reacts with the redox-active inorganic salt to form a colored pigment. This can selectively color the area of the three-dimensional printed object where the redox-active inorganic salt was present. Thus, the processes described herein can be used for aesthetic reasons to create colors on the surface of three-dimensional printed objects during post-processing.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description primarily describes the use of pigment colorants, the term "pigment" can be used to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

An example ion-sensing agent was prepared by dissolving 3 wt % of $K_3[Fe(CN)_6]$ in deionized water. This ion-sensing agent was loaded in a fluid jet print head of an HP MULTI-JET FUSION 3D® test printer (HP, Inc., USA). A black fusing agent that included a black pigment as an electromagnetic radiation absorber and a low-tint fusing agent that had a light blue tint were also loaded in fluid jet print heads of the test printer. The powder bed material used was polyamide 12 powder with a small amount of titanium dioxide mixed in to increase the whiteness of the powder.

A sample object was printed using the test printer. The object was a rectangle having a core formed with the black fusing agent. A layer of a few millimeters on all surfaces of core was formed with the low-tint fusing agent, so that surface of the rectangular object had a light blue tint. Additionally, the example ion-sensing agent was jetted on areas of the outer layer that formed the word "IRON."

After printing, the rectangular object was dipped in an aqueous solution of 1 wt % $FeSO_4$, which provided $Fe^{2+}$ ions. The word "IRON" immediately changed to a darker blue color upon dipping, while the surrounding areas of the rectangular object remained the original light blue color. These results show that the redox-active inorganic salt from the ion-sensing agent remained stable through the three-dimensional printing process and that the redox-active inorganic salt can react with iron ions to form a visible color change. The dark blue color indicates the formation of Prussian blue pigment. It is expected that other colored pigments can be formed using this process, with different redox-active inorganic salts and target ions.

What is claimed is:

1. A multi-fluid kit for three-dimensional printing, the multi-fluid kit comprising:
a fusing agent comprising water and an electromagnetic radiation absorber, wherein the electromagnetic radiation absorber absorbs radiation energy and converts the radiation energy to heat; and
an ion-sensing agent comprising:
water; and
a redox-active inorganic salt present in an amount of from about 0.5 wt % to 3 wt % with respect to a total weight of the ion-sensing agent.

2. The multi-fluid kit of claim 1, wherein the redox-active inorganic salt is $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$.

3. The multi-fluid kit of claim 1, wherein the fusing agent is a colorless fusing agent or a low tint fusing agent.

4. The multi-fluid kit of claim 1, wherein the ion-sensing agent consists of the water and the redox-active inorganic salt.

5. A three-dimensional printing kit, comprising:
a powder bed material comprising polymer particles;
a fusing agent comprising water and an electromagnetic radiation absorber, wherein the electromagnetic radiation absorber absorbs electromagnetic radiation energy and converts the electromagnetic radiation energy to heat; and
an ion-sensing agent comprising:
water; and
a redox-active inorganic salt present in an amount of from about 0.5 wt % to 3 wt % with respect to a total weight of the ion-sensing agent.

6. The three-dimensional printing kit of claim 5, wherein the polymer particles comprise polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof.

7. The three-dimensional printing kit of claim 5, wherein the powder bed material further comprises titanium dioxide present in an amount of from about 1 wt % to about 5 wt % with respect to the total weight of the powder bed material.

8. The three-dimensional printing kit of claim 5, wherein the redox-active inorganic salt is $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$.

9. The three-dimensional printing kit of claim 5, wherein the fusing agent is a colorless fusing agent or a low tint fusing agent.

10. A method of making a three-dimensional printed ion sensor utilizing the three-dimensional printing kit of claim 5, the method comprising:
iteratively applying individual build material layers of the polymer particles to a powder bed;
based on a three-dimensional object model, jetting the fusing agent onto the individual build material layers;
based on the three-dimensional object model, jetting the ion-sensing agent onto the individual build material layers; and
exposing the powder bed to energy to selectively fuse the polymer particles in contact with the electromagnetic radiation absorber to form a fused polymer matrix including the redox-active inorganic salt immobilized in the fused polymer matrix at individual build material layers.

11. The method of claim 10, wherein the fusing agent is a colorless fusing agent or a low tint fusing agent.

12. The three-dimensional printing kit of claim 5, wherein the ion-sensing agent consists of the water and the redox-active inorganic salt.

13. A method of sensing a metal ion, the method comprising:
exposing a three-dimensional printed ion sensor having a fused polymer matrix with a redox-active inorganic salt immobilized therein to a solution comprising a target metal ion; and
reacting the redox-active inorganic salt with the target metal ion during the exposing to form a water-insoluble colored pigment that colors a portion of a surface of the three-dimensional printed ion sensor, the colored portion indicating a presence of the target metal ion.

14. The method of claim 13, wherein the target metal ion is a cation selected from the group consisting of $Fe^{2+}$, $Fe^{3+}$, $Zn^{2+}$, $Cu^{2+}$, and $Ba^{2+}$, and wherein the redox-active inorganic salt is $K_2CrO_4$, $Na_2CrO_4$, $NaHCO_3$, $Na_2CO_3$, $Na_2SO_4$, $NaOH$, $K_4[Fe(CN)_6]$, or $K_3[Fe(CN)_6]$.

* * * * *